Aug. 4, 1931.  C. L. MATTISON  1,817,493
TURNING MACHINE
Filed Dec. 10, 1928    3 Sheets-Sheet 1
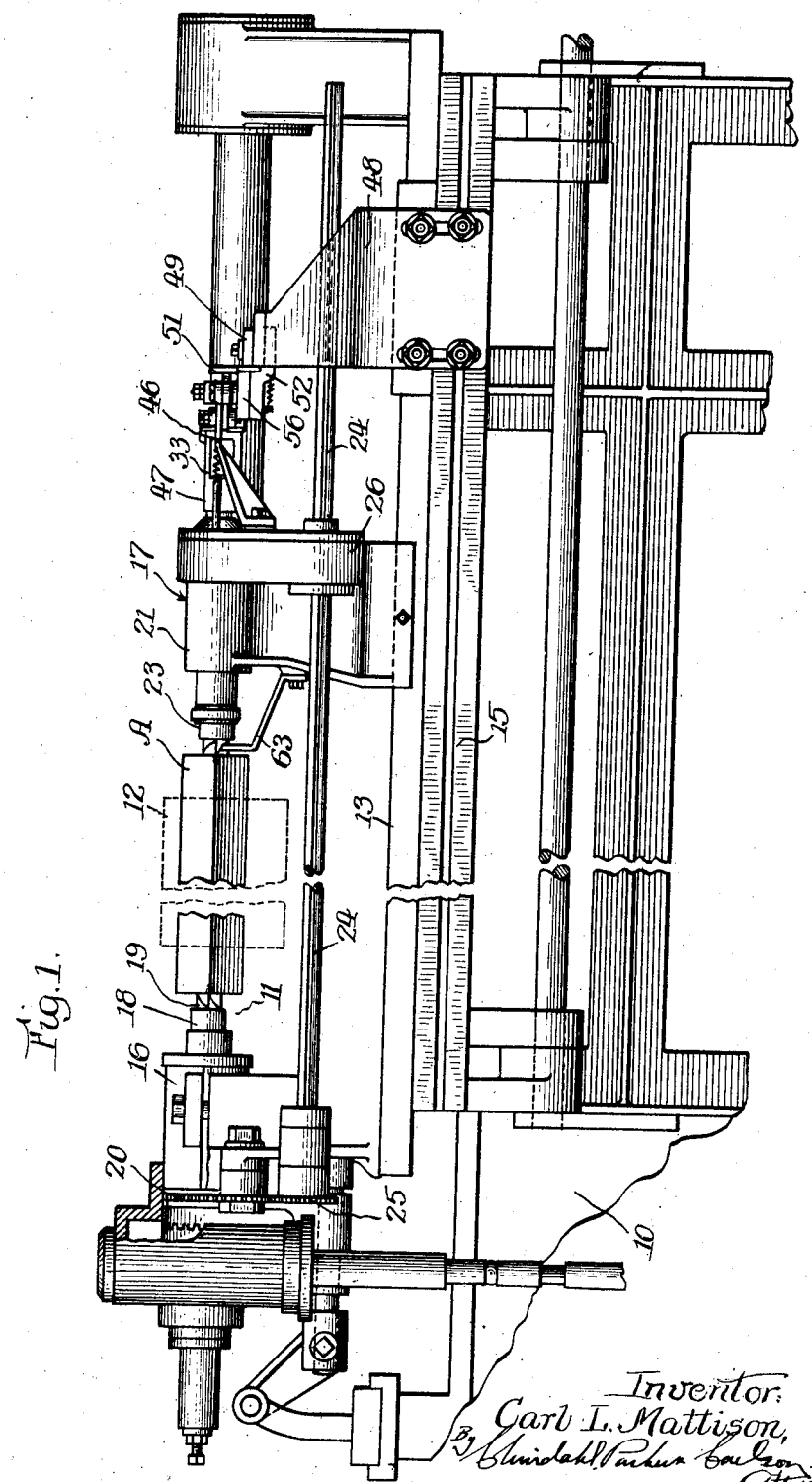

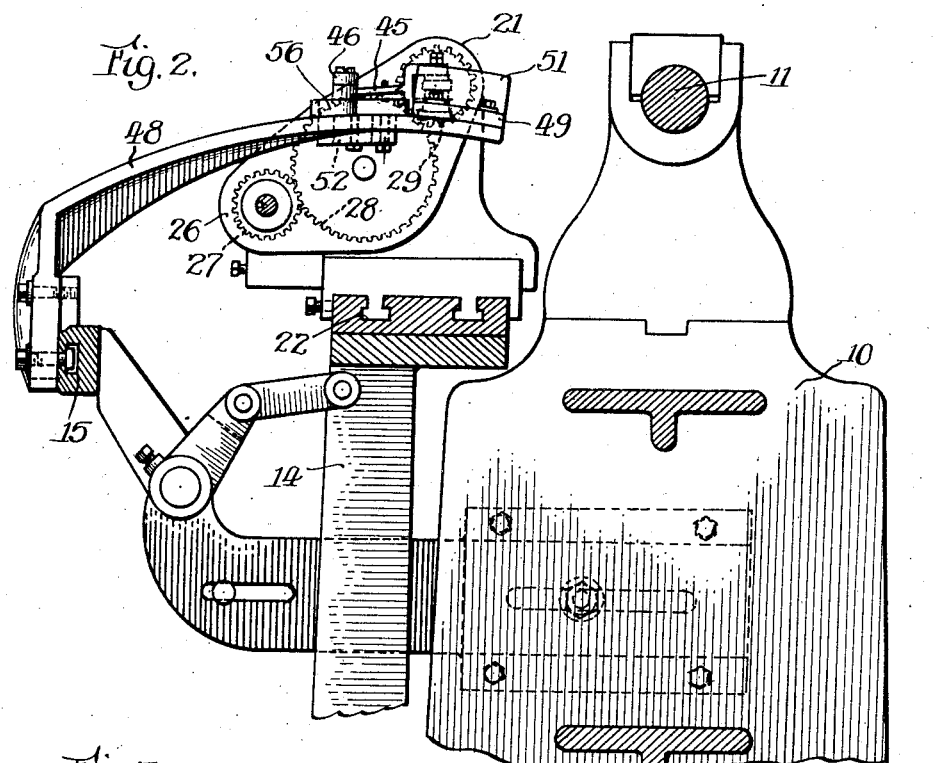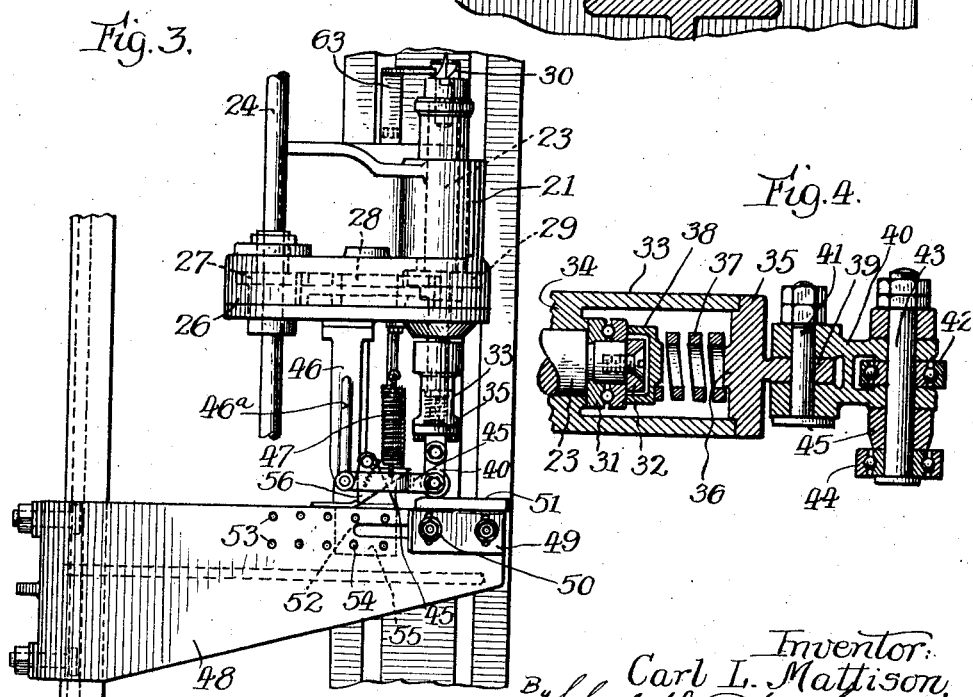

Aug. 4, 1931.  C. L. MATTISON  1,817,493
TURNING MACHINE
Filed Dec. 10, 1928   3 Sheets-Sheet 3
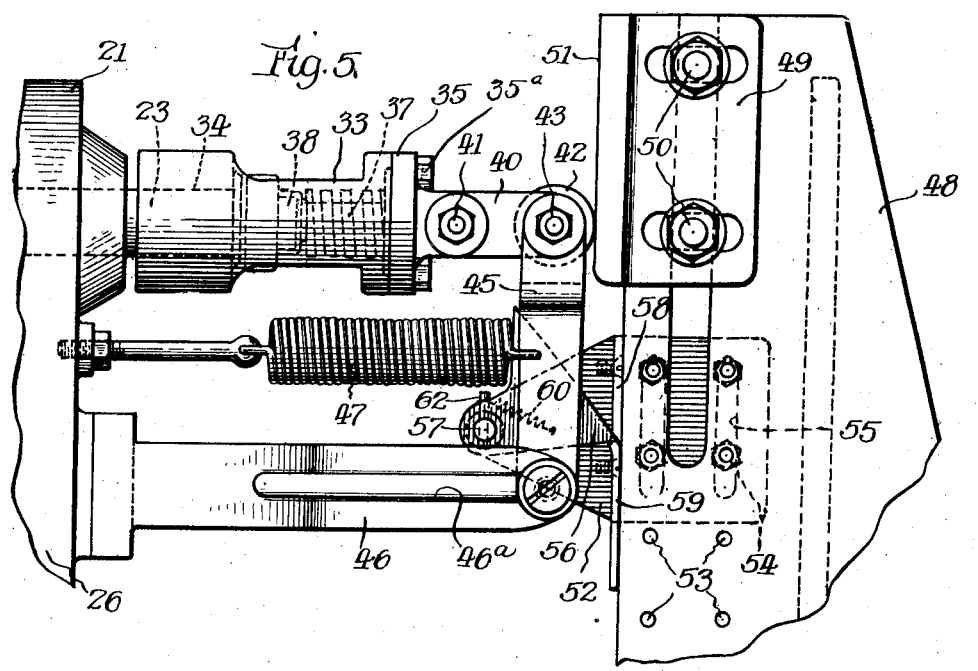
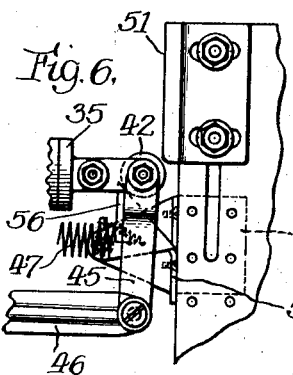
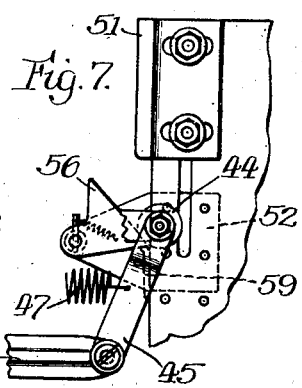
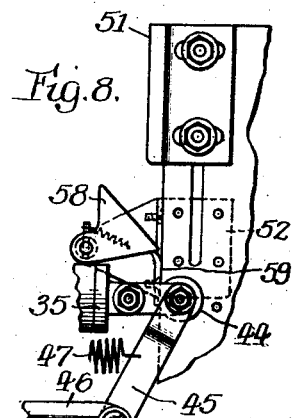
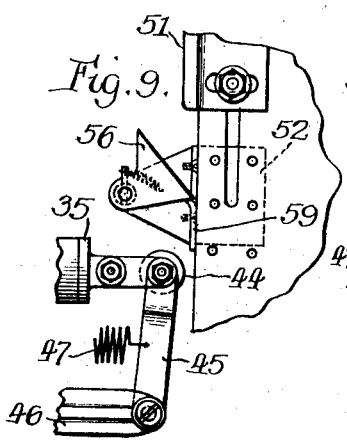
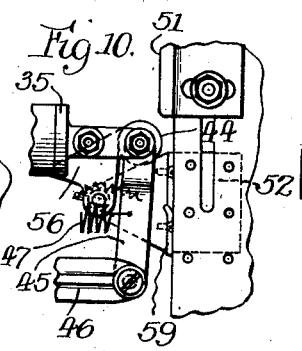
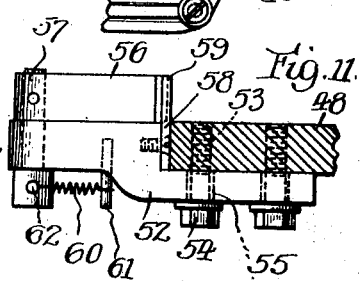
Inventor:
Carl L. Mattison,
Attys.

Patented Aug. 4, 1931

1,817,493

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

TURNING MACHINE

Application filed December 10, 1928. Serial No. 324,831.

The invention relates generally to turning machines, such, for example, as are used in turning and shaping wood articles, and has more particular reference to a machine of this character embodying means for decreasing the idle time of the machine between turning operations.

In machines of the type to which this invention relates the efficiency of the machine is commensurate with the amount of work which may be finished in a given space of time. Obviously, then, the efficiency thereof may be enchanced by eliminating, to the greatest possible extent, the idle time of the machine; that is to say, those periods of the cycle of operation in which a finished article is removed from the machine and a new work blank inserted, during which time the cutters are not operating. A certain portion of this idle time must necessarily be expanded in releasing the finished article from its position between the head and tailstock spindles and in inserting and clamping a fresh work blank therebetween.

It is an object of the invention therefore, to provide a new and improved machine organization embodying an entirely automatically operating mechanism for releasing the operative engagement of the head and tailstock spindles with an article which is further automatically operable to engage, in clamping relation, a fresh piece of work.

Another object of the invention is to provide a tailstock including a spindle constructed to engage one end of an article which spindle is automatically movable during part of the machine movement out of and into such engagement.

A further object of the invention resides in the provision, in a machine of this character, of a spindle movable longitudinally of the bed of the machine into and out of engagement with an article, and means for effecting such movement including a cam for retracting said spindle automatically to free an engaged article and hold said spindle retracted during the removal of a finished and insertion of a new piece of work, means for moving said spindle automatically into engagement with the newly inserted article, and a second cam for producing a clamping relation between the spindle and the article; each element of said means being disposed for successive operation on the spindle during the cycle of a particular machine movement.

Other objects and advantages will become apparent in the following description and from the accompanying drawings, in which:

Figure 1 is a fragmentary front elevation of a turning machine embodying the invention.

Fig. 2 is an enlarged fragmentary end elevation, partly in section, showing the actuating means for the automatic tailstock spindle.

Fig. 3 is a fragmentary plan view of the tailstock.

Fig. 4 is a detail view showing the outer end of the tailstock spindle in vertical central section.

Fig. 5 is an enlarged fragmentary plan view of the means for automatically actuating the tailstock spindle.

Figs. 6 to 10 inclusive are somewhat diagrammatic plan views of the actuating means shown in Fig. 5 and represent in numerical order the progressive positions assumed by the actuating elements during one cycle of operation on the spindle.

Fig. 11 is a detail view of the releasing cam mounting.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

The machine chosen for the purposes of illustration of the new organization is of the type which embodies a stationarily mounted rotating cutter head and a swingable work table movable to and from operative relation with the cutter. Referring particularly to Fig. 1, a main frame or base 10 is provided on which a cutter spindle 11 is rotatably mounted for supporting a cutter indicated in dotted outline at 12. The piece of work A is supported upon a movable table 13 which is mounted for swinging movement between an operative position in which the work is adjacent the cutter 12 to an inoperative position remote from the cutter where the work may be removed and replaced. In effecting this movement the table 13 is carried upon the upper end of an upright frame 14 (Fig. 2) pivotally supported at its lower end by suitable bearings (not shown) upon the forward side of the base 10.

Suitable means may be provided for swinging the table relative to the base to move the work to and from the cutter, which means, since it forms no part of the present invention has not been shown. A stationary supporting bar 15 is rigidly incorporated with the base to extend longitudinally along the front thereof and is spaced laterally from the base beyond the remote inoperative position of the swinging table.

A headstock 16 and a tailstock 17 are supported upon the table top for swinging movement therewith. The headstock includes a headstock spindle 18 and work center 19 driven by any suitable mechanism indicated generally at 20, which permits of the swinging movement of the headstock.

Before particularly describing the machine elements by which the automatic release and clamping of the work is attained, it may be stated that the arrangement of parts is such that the tailstock spindle is withdrawn from and held out of engagement with the work during the first portion of the swinging movement of the table 13 from its operative position adjacent the cutter. While in this position the work is removed and a new piece of work is inserted between the headstock and tailstock spindles. Subsequently, a further withdrawing movement of the table produces an advancing movement of the spindle into holding engagement with the work. And finally as the table returns to carry the work into operative position relative to the cutter, the spindle is moved into positive clamping engagement with the work.

Referring to Figs. 1, 2 and 3, the tailstock, in its present embodiment, comprises a hollow casing 21 mounted on the table 13 for relative longitudinal adjustment as by means of the T-slots 22. A tailstock spindle 23, which for convenience will be hereinafter termed the spindle 23, is journalled for rotation as well as limited axial movement in the casing with the axis thereof alined longitudinally with the axis of the headstock spindle 18. The spindle 23 is preferably driven at a speed corresponding to the speed of the headstock spindle and any suitable drive may be employed. This means, as shown herein, comprises an elongated shaft 24, driven, as at 25, from the headstock spindle driving connections, and extending longitudinally of the table through a gear housing 26 which may be formed as a part of the casing 21. The shaft 24 is splined to form a well known sliding driving connection with a gear 27 mounted thereon and journalled in the housing 26. The gear 27 meshes with an idler gear 28 which in turn drives a third or spindle gear 29 mounted on the spindle 23. The spindle gear is splined on the spindle 23 so that relative axial sliding movement therebetween may occur while the spindle is being driven.

This construction provides a simple drive for the spindle 23 which is effective at all of the positions of adjustment of the tailstock and which further permits the clamping and releasing movement of the spindle without stopping the rotation thereof.

The preferred arrangement by which the work is automatically engaged and released by the head and tailstock spindles comprises, in this embodiment, a series of cam surfaces positioned for engagement by cam followers carried by the axially movable spindle 23 during the swinging movement of the table from and toward its operative position adjacent the cutter.

The cam engagements serve to retract the spindle at appropriate predetermined points in the table movement and to maintain the spindle in positive clamping engagement with the work during the cutting operation. Other means are provided which operate, when the cam followers are out of engagement with the work, to urge the spindle toward a work engaging position whereby the work may be carried from one position to another during the travel of the table.

More particularly describing this arrangement, with special reference at this time to the tailstock spindle construction shown in Figs. 3 and 4, the inner or work engaging end of the spindle carries a work center 30 of any preferred type. The other or outer end of the spindle extends beyond the end of the casing 21 and has a thrust bearing 31 (Fig. 4) which is somewhat larger in diameter than the end of the spindle, secured on the end in any suitable manner, as by the screw and washer arrangement 32. A sleeve 33 is mounted on the end of the spindle to extend outwardly about the thrust bearing by means of an inwardly directed annular shoulder 34 which fits snugly and slidably about the spindle, said sleeve being held against movement from the spindle by the abutting engagement of the shoulder with one side of the thrust bearing 32. The free end of the sleeve is suitably closed as by means of a cap-plate 35 which is detachably secured thereto by the bolts and lugs 35ª to form a spring housing slidably and rotatably mounted on the outer end of the spindle.

The inner side of the plate 35 is formed to provide a circular raised portion or boss 36 which serves as one seat for a relatively heavy helically coiled spring 37, the other end of which bears on a cup-shaped member 38 loosely covering the screw and washer 32 and resting upon the outer side of the thrust bearing 31. Preferably the construction of the spring is calculated in such manner that the spring is under compression only when the sleeve 33 has moved inwardly on the spindle away from its engagement with the thrust bearing 31. Or in other words, the force of the spring is exerted only to maintain the shoulder 34 in abutment with the thrust bearing.

The means by which the spindle is normally urged inwardly or toward the work engaging position comprises a system of linkage through which a resilient force is exerted axially on said spindle. To this end, an arm 39, formed integrally with the cap-plate 35, extends axially outwardly therefrom a short distance and is straddled by the opposing legs of a substantially H-shaped link 40. A pivot pin 41 secures the arm and the link together. The other opposing legs of the link 40 receive therebetween a cam follower in the form of a roller 42 which is held in place by the pin 43. In assembly the pins 41 and 43 are positioned in parallel vertical relation so that relative movement between the parts is confined to a horizontal plane.

A second cam roller 44 is also mounted upon the pin 43 in underlying spaced relation to the roller 42, the spacing being maintained by one end of a link 45 also mounted on the pin 43. The other end of the link 45 is pivotally connected for movement in a horizontal plane, to the outer end of a stationary bracket 46 carried by the gear housing 26, and a helical contractile spring 47 connected to the link 45 between the ends thereof and to the housing is arranged to exert a constant pull upon the link. Thus the pull of the spring will be transmitted to the spindle through the connecting link 45, the H link 40, the arm 39 and the pivots 41 and 43 to urge the spindle inwardly. If desired adjustment of the link 45 on the bracket 46 may be accomplished by providing the well-known type of elongated slot connection 46ª therebetween.

The cam surfaces which coact with the cam followers to actuate the spindle, are carried by a stationary part on the frame of the machine, such as illustrated (Figs. 1, 2 and 3), as overarm 48 mounted on the supporting bar 15 for adjustment longitudinally of the frame of the machine. The bracket extends rearwardly of the frame to overlie the swinging table but is positioned just beneath and to one side of the path described in the swinging movement of the cam followers.

Near its free end the overarm carries a cam member 49 in the form of an L-shaped bracket secured through one leg by the slot and bolt connections 50 for adjustment along the axis of the spindle. The other leg of the bracket rises from the inner side of the overarm to present a cam surface 51 for engagement by the upper one 42 of the cam followers when the swinging table is in or immediately next to its operative position adjacent the cutter.

The action resulting from this cam engagement may best be seen in Figs. 4 and 5. As the cam follower 42 engages the cam surface 51 the housing formed by the sleeve 33 is moved axially upon the spindle away from its abutment with the thrust bearing and against the force of the spring 37. The tension in the spring thus set up is exerted directly against the thrust bearing to urge the spindle inwardly. Thus a piece of work held between the head and tailstock spindles will be subjected to a positive and powerful clamping engagement which is maintained during the working operation. The spring pressed spindle is advantageous since it forms what may be termed a floating clamping means, inasmuch as the clamping force may accommodate itself automatically to either a hard or soft piece of work or slight variation in length of work.

Forwardly of the bracket 49 a second cam bracket 52 (Fig. 11) is secured to the lower side of the overarm to extend laterally of the overarm on the spindle side thereof. The means for securing the bracket 52 in place preferably permits adjustment of position relative to the overarm. Thus a series of screw threaded apertures 53 in the overarm may be engaged, headed bolts 54 extending through elongated slots 55 in the bracket, the slots permitting bracket adjustment intermediate the bolt apertures.

The bracket 52 is offset upwardly a sufficient distance to make the upper surfaces of the bracket and overarm substantially flush. This surface of the bracket supports a cam member 56 which is preferably triangular in shape and is mounted for pivotal movement relative to the bracket upon a vertically extending pivot pin 57 fixed to and movable therewith. The relationship of parts, in mounting the cam 56, is such that one side thereof slopes inwardly and rearwardly from the inner side of the overarm and lies in the path of movement of the lower cam follower 44.

A stop for limiting the swinging movement of the cam in an outward direction is provided and this means further comprises an additional cam follower engaging surface in the form of a dwell surface. Thus a flat plate 58 is secured to the bracket between the inner side of the overarm and the offset portion of the bracket 52 with a portion of the plate extending upwardly, as at 59, to substantially the height of the cam 56. The inner end of the extending portion 59 is positioned to be engaged by one end of the cam 56 to prevent movement thereof in one direction and this abutting end may be slightly arcuate to register with the sloping face of the cam thereby forming a continuous cam surface.

The cam is held yieldingly against the stop plate 59 in any suitable manner as by interposing a contractile spring 60 between a pin 61 on the bracket and a second pin 62 carried by the swinging pivot pin 57.

Operation

The operation of the organization may best be described in the order of successive steps in the cycle of operations. These steps are clearly illustrated in their order of occurrence in Figs. 5 to 10 inclusive.

Assuming that the machine has been properly adjusted for a working operation of a certain character and that the cutters have just finished a piece of work held between the head and tailstock spindles, the assembly is in the position shown in Fig. 5. In this position the swinging table 13 is in its operative position, and the cam follower 42 is in engagement with the cam surface 51 to produce the positive clamping engagement of the work spindles with the work.

The operator, wishing to remove the finished piece of work and insert a new piece, swings the table 13 forwardly. The first movement of the table through a short distance (see Fig. 6) frees the follower 42 from the cam surface 51 which relieves the tension of the clamping spring 37. This loosens the engagement of the spindle with the work but a holding engagement is maintained by the force of the spring 47 pulling the spindle inwardly.

Continued movement of the table brings the lower cam follower 44 into engagement with the sloping surface of the swinging cam 56 which during this engagement is held against movement by the stop 59. The cam follower in riding on the cam surface (as in Fig. 7) moves the spindle outwardly against the force of the spring 47 and releases the holding engagement of the spindle with the work.

Since the surfaces of the sloping cam and the stop means are substantially in registry the cam follower 44 may pass from one to the other, into the position shown in Fig. 8. The operator, when the parts have reached this position, ceases to move the table, and with the spindle still held in retracted position, removes the finished piece of work and inserts a new piece in proper position in suitable holding means for engagement by the spindles.

This having been done, the operator continues the forward movement of the table causing the cam follower to ride off of the dwell surface 59 and permitting the spindle to be pulled sharply inwardly as in Fig. 9, into holding engagement with the work piece by the spring 47. The direction of movement of the table is then reversed to move the table toward its operative position, during which movement the cam follower 44 strikes the rear side of the cam 56 and swings the cam about the pivot 57 (Fig. 10) to permit the follower to pass. As soon as the follower has passed the cam, said cam is returned to its normal position by the spring 60, after which the upper cam follower 42 engages the stationary cam surface 51 to force the spindle into the initially described clamping engagement with the work.

Thus, it may be seen that, in a single machine movement, that is in a single forward and return swing of the table, the spindle is automatically released from clamping position, retracted from holding position, returned to holding position relative to a new piece of work, and clamped for a working operation.

If desired, a stripping means for insuring complete release of the work by the spindle, may be provided such as, for example, (Figs. 1 and 3) a finger 63 rigidly secured to the gear housing 26 and properly shaped to position the free end adjacent the spindle center 30. Upon retraction of the spindle, the work, if not already free, will be engaged by the end of the stripper and be forcibly disengaged from the center.

I claim as my invention:

1. A machine of the character described comprising, in combination, a shiftable carriage, a spindle mounted thereon for axial movement, and spindle-actuating means operated by the movement of said carriage to move said spindle from a work engaging position to a work releasing position and return, said means comprising a stationary clamping cam, means cushioning the force exerted by said cam on said spindle, a spindle-retracting cam, and a spring effecting the return movement of said spindle after release by said retracting cam, said retracting cam being movable to permit the return passage of said spindle into re-engagement with said first mentioned cam.

2. In a machine of the character described, the combination of a shiftable carriage, an axially shiftable spindle adapted in one position thereof to engage a piece of work, a spring tending to move said spindle to its work-engaging position, means operable in the shifting movement of said carriage in one direction to withdraw said spindle from said position and then to release the spindle for clamping movement by said spring, said means being ineffective upon said spindle during movement of the carriage in the opposite direction, a cam device for effecting a further movement of said spindle toward the piece of work, and resilient means interposed between said spindle and said cam to cushion the effect of the cam and to maintain the operative relation between said spindle and said piece of work produced by the action of said cam.

3. In a machine of the character described, the combination of an axial movable spindle adapted in one direction of movement to engage a piece of work, a first resilient means exerting a tension on said spindle normally to maintain said spindle in holding engagement with a piece of work, a second resilient means connected to said spindle for maintaining an operative engagement of said spindle with a piece of work only when said piece of work is in position to be operated upon, and means operable when the work is in position to be operated upon to compress said second resilient means and thereby to apply an additional force to said spindle tending to maintain the spindle in engagement with the work.

4. A turning machine comprising, in combination, a shiftable carriage, a work spindle mounted thereon for axial movement into and out of operative engagement with a piece of work, a follower operatively associated with said spindle for moving the same longitudinally, a bracket mounted adjacent the line of movement of said carriage for adjustment along said line, a pivoted cam mounted on said bracket and shiftable by said follower to an ineffective position when said carriage is moved in a first direction having a surface thereon engageable by said follower in the shifting movement of said carriage in a second direction to withdraw said spindle from a work engaging position, and a stationary member mounted on said bracket and having a cam surface thereon positioned to complement the spindle withdrawing surface of said pivoted cam and operable through said follower to maintain the spindle in its withdrawn position during a continued shifting movement of the carriage in said second direction, said member being arranged to permit said follower to strike said pivoted cam in the movement of the carriage in said first direction.

5. A turning machine comprising, in combination, a shiftable carriage, a work spindle mounted thereon for axial movement into and out of operative engagement with a piece of work, a cam follower operatively connected to said spindle for shifting the same, and means for moving said spindle axially during the shifting movement of said carriage in a first direction comprising a pivoted cam shiftable to an ineffective position by said follower when the carriage is moved in a second direction and having a surface thereon engageable by said follower in the shifting movement of said carriage in said first direction to withdraw said spindle from a work engaging position, and a stationary member having a cam surface onto which said follower may pass from the spindle withdrawing surface of said pivoted cam, said last mentioned cam surface being arranged to maintain said spindle in its withdrawn position during a portion of the shifting movement of the carriage in said first direction and terminating abruptly to permit movement of the spindle back to its work engaging position, said member being arranged to permit movement of the cam follower into engagement with said pivoted cam upon movement of the carriage in said second direction.

In testimony whereof, I have hereunto affixed my signature.

CARL LAWRENCE MATTISON.